US009055519B2

(12) United States Patent  
Sridhara et al.

(10) Patent No.: US 9,055,519 B2  
(45) Date of Patent: Jun. 9, 2015

(54) ACCESS POINTS SELECTION APPARATUS AND METHODS

(75) Inventors: Vinay Sridhara, Santa Clara, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 13/397,937

(22) Filed: Feb. 16, 2012

(65) Prior Publication Data

US 2013/0065633 A1    Mar. 14, 2013

Related U.S. Application Data

(60) Provisional application No. 61/532,761, filed on Sep. 9, 2011.

(51) Int. Cl.
| | |
|---|---|
| *H04B 7/00* | (2006.01) |
| *H04W 48/20* | (2009.01) |
| *H04W 88/08* | (2009.01) |
| *H04W 92/04* | (2009.01) |

(52) U.S. Cl.
CPC .............. *H04W 48/20* (2013.01); *H04W 88/08* (2013.01); *H04W 92/045* (2013.01)

(58) Field of Classification Search
CPC .................................................... H04W 48/20
USPC ........ 455/525, 552.1, 445, 452.2, 522, 426.1; 370/338, 328, 252

See application file for complete search history.

(56) References Cited

U.S. PATENT DOCUMENTS

| 7,855,977 | B2 * | 12/2010 | Morrison et al. ............. 370/252 |
| 8,270,374 | B2 * | 9/2012 | Cai et al. ........................ 370/332 |
| 2008/0080387 | A1 | 4/2008 | Wang et al. |
| 2008/0080436 | A1 * | 4/2008 | Sandhu et al. ................ 370/338 |
| 2008/0293404 | A1 * | 11/2008 | Scherzer et al. ........... 455/426.1 |
| 2009/0029645 | A1 | 1/2009 | Leroudier |
| 2009/0042557 | A1 * | 2/2009 | Vardi et al. ................. 455/422.1 |
| 2009/0111474 | A1 * | 4/2009 | Hill et al. ...................... 455/445 |
| 2009/0124284 | A1 * | 5/2009 | Scherzer et al. ........... 455/552.1 |
| 2009/0197603 | A1 * | 8/2009 | Ji et al. .......................... 455/436 |
| 2009/0247181 | A1 * | 10/2009 | Palanki et al. ............. 455/452.2 |
| 2009/0257361 | A1 * | 10/2009 | Deshpande et al. .......... 370/252 |

(Continued)

FOREIGN PATENT DOCUMENTS

| EP | 2081324 B1 | 1/2013 |
| GB | 2452794 A | 3/2009 |

(Continued)

OTHER PUBLICATIONS

International Search Report and Written Opinion—PCT/US2012/054392—ISA/EPO—Jan. 28, 2013.

*Primary Examiner* — Sanh Phu  
(74) *Attorney, Agent, or Firm* — Kevin T. Cheatham

(57) ABSTRACT

A method of providing network data to a Station includes receiving, by an Access Point of a plurality of Access Points, a request for network link data output by the Station, to be used by the Station in deciding which of the plurality of Access Points to connect to; initiating, by the Access Point, backhaul measurements over a wireless network that includes the Access Point and a Gateway; obtaining and storing, by the Access Point, backhaul measurement data based on the backhaul measurements performed; and providing the backhaul measurement data to the Station.

46 Claims, 4 Drawing Sheets

(56) References Cited

U.S. PATENT DOCUMENTS

| | | |
|---|---|---|
| 2009/0264123 A1 | 10/2009 | Agashe et al. |
| 2010/0165857 A1* | 7/2010 | Meylan et al. ............... 370/252 |
| 2010/0322144 A1 | 12/2010 | Lee et al. |
| 2011/0119360 A1 | 5/2011 | Kish et al. |
| 2012/0294179 A1* | 11/2012 | Tafreshi ...................... 370/252 |
| 2013/0310051 A1* | 11/2013 | Roddy et al. ................. 455/445 |

FOREIGN PATENT DOCUMENTS

| | | |
|---|---|---|
| JP | 2009506712 A | 2/2009 |
| WO | 2006138122 A2 | 12/2006 |

\* cited by examiner

ACCESS POINTS SELECTION APPARATUS AND METHODS

CROSS-REFERENCE TO RELATED PATENT APPLICATIONS

The present application claims priority to provisional U.S. application Ser. No. 61/532,761, entitled "Low Overhead End-To-End WLAN AP Selection" filed Sep. 9, 2011, assigned to the assignee hereof and incorporated herein by reference.

BACKGROUND

1. Field of the Disclosure

This disclosure relates generally to apparatus and methods for Access Point (AP) selection made by a Station (STA), such as a cellular telephone, in a wireless network. More particularly, the disclosure relates to an apparatus and method for providing low overhead end-to-end Wireless Local Area Network (WLAN) Access Point (AP) selection.

2. Related Art

WiFi offloading is becoming increasingly important as cellular networks become congested. With thousands of APs available for providing wireless hotspots, AP selection is becoming an important feature that will be utilized continuously for a mobile user. In conventional systems, the STA, which can be a cellular telephone for example, performs AP selection based on analysis of a wireless link to various APs near the STA. However, the wireless link between the STA and the AP is only one portion of a communication channel between a source device (e.g., the STA) and a destination device (e.g., another STA on the WLAN network).

In conventional methods and systems, a STA obtains backhaul information by probing one or a set of predefined servers for relevant data (e.g., round-trip time, bandwidth, etc.). However, this causes increased contention and power drain for the STA, which is typically a mobile device, because each STA must perform independent high overhead measurements to determine the best AP to connect to.

SUMMARY OF THE DISCLOSURE

Various embodiments are directed to performing end-to-end AP selection in a network, such as a wireless local area network (WLAN).

In various embodiments a method of providing network data to a Station includes, but is not limited to, any one or combination of: (i) receiving, by an Access Point of a plurality of Access Points, a request for network link data output by the Station, to be used by the Station in deciding which of the plurality of Access Points to connect to; (ii) initiating, by the Access Point, backhaul measurements over a wireless network that includes the Access Point and a Gateway; (iii) obtaining and storing, by the Access Point, backhaul measurement data based on the backhaul measurements performed; and (iv) providing the backhaul measurement data to the Station.

In various embodiments, initiating includes transmitting probing signals from the Access Point to the Gateway and obtaining backhaul bandwidth data and latency data based on receipt of the probing signals from the Gateway to the Access Point.

In various embodiments, the method includes determining, by the Access Point, one or more of throughput load and user share information based on the backhaul measurement data obtained; and providing the one or more of throughput load and user share information to the Station.

In various embodiments, the method further includes determining wireless link statistics between the Station and the Access Point. In some embodiments, the determining is performed by the AP. The backhaul measurement data provided to the station includes the wireless link statistics. In some embodiments, the determining is performed by the Station.

In various embodiments, the method further includes transmitting, to one of an Access Point controller associated with the AP or the Gateway, a request from the AP to perform the backhaul measurements; and receiving, by the Access Point, backhaul measurement data based on the backhaul measurements performed by the one of the Access Point controller or the Gateway.

In various embodiments, the method further includes caching the backhaul measurement data at the Access Point and sending the cached backhaul measurement data to the Station. In some embodiments, the cached backhaul measurement data was obtained based on a previous request made by a Station. In some embodiments, the cached backhaul measurement data was obtained based on a previous link measurement made by the AP controller or the Gateway that was not based on an end-to-end link request made by a Station.

In various embodiments, providing includes sending the backhaul measurement data to the Station in the form of a beacon, an 802.11.u service advertisement, or as a Hypertext Transfer Protocol (HTTP) message.

A computer program product for performing Access Point selection includes a computer-readable medium that includes code for, but is not limited to, any one or combination of: (i) receiving a request for network link data output by a Station, to be used by the Station in deciding which Access Point of a plurality of Access Points to connect to; (ii) initiating backhaul measurements over a wireless network that includes the Access Point and a Gateway; (iii) obtaining and storing backhaul measurement data based on the backhaul measurements performed; and (iv) providing the backhaul measurement data to the Station.

An Access Point apparatus for providing network data to a Station includes (but is not limited to) means for receiving a request for network link data output by the Station, to be used by the Station in deciding which of the plurality of Access Points to connect to. The apparatus also includes means for initiating backhaul measurements over a wireless network that includes the Access Point and a Gateway. The apparatus includes means for obtaining and storing backhaul measurement data based on the backhaul measurements performed. The apparatus also includes means for providing the backhaul measurement data to the Station.

An Access Point apparatus for providing network data to a Station includes (but is not limited to) a receiver, a processor, a storage medium, and a transmitter. The receiver is for receiving a request for network link data output by the Station, to be used by the Station in deciding which of the plurality of Access Points to connect to. The processor is for initiating backhaul measurements over a wireless network that includes the Access Point and a Gateway. The processor is configured to obtain backhaul measurement data based on the backhaul measurements performed. The storage medium is for storing the backhaul measurement data. The transmitter is for transmitting the backhaul measurement data to the Station.

A method of providing network data to a Station includes, but is not limited to, any one or combination of: (i) receiving, by a first Access Point providing connectivity to a first type of network and a second Access Point providing connectivity to a second type of network, a request for network link data output by the Station, to be used by the Station in deciding which of a plurality of Access Points to connect to; (ii) initiating, by the first Access Point and the second Access Point, backhaul measurements over the first and second types of networks, respectively; (iii) obtaining and storing, by the first Access Point and the second AP, backhaul measurement data based on the backhaul measurements performed over the first and second types of networks, respectively; and (iv) providing the backhaul measurement data over the first and second types of networks, respectively to the Station.

In various embodiments, an AP, instead of an STA, performs backhaul measurements to reference servers to determine the bandwidth and latency metrics of end-to-end communications paths that involve each of the APs. That way, the STA is not burdened by having to perform such measurements, the STA does not have to expend resources to output probes to the APs to perform backhaul measurements of a network, and the local WLAN traffic is not increased for the purposes of diagnostics. Accordingly, by having the APs initiate and perform the backhaul measurements, overhead requirements are shifted from the STA, which generally have fewer computational resources than the APs, to the APs, which can more readily handle those requirements relative to the STA.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
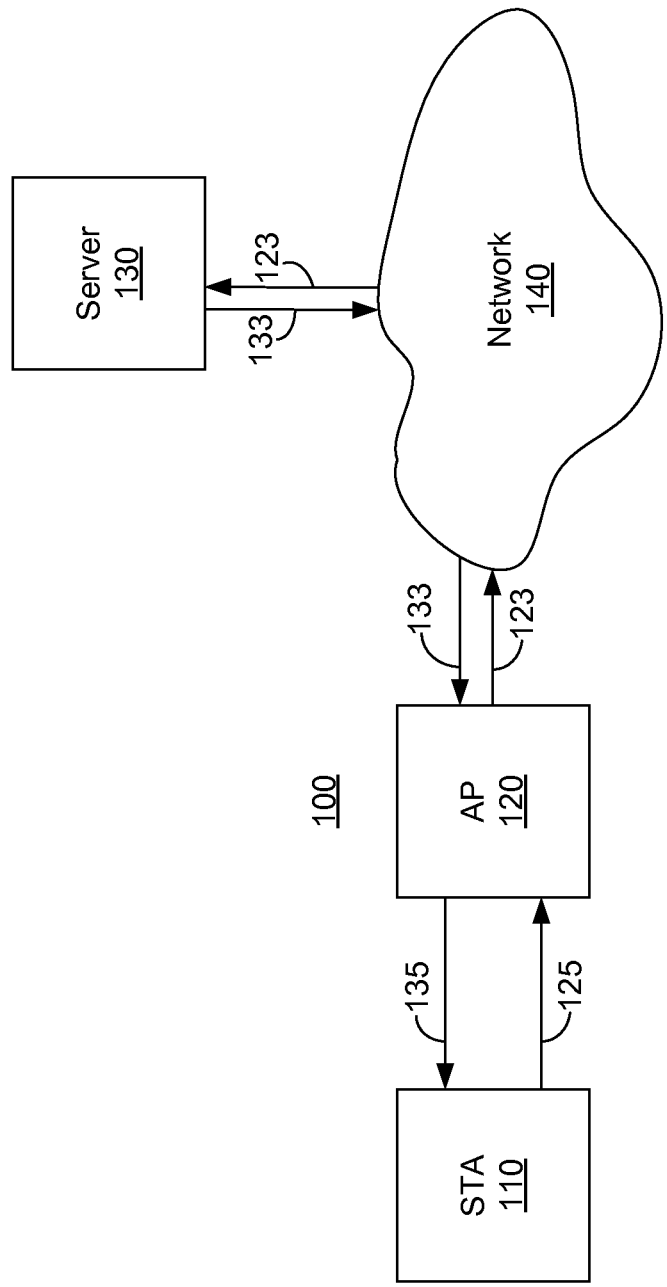
FIG. 1 is a network environment according to various embodiments of the disclosure.

FIG. 1 is a network environment 100 in which a STA 110 obtains end-to-end information of the network 100 from an AP 120. The STA 110 outputs a message 125 to the AP 120, requesting backhaul information. In response to receiving the message 125, the AP 120 sends probing signals 123 to the one more reference servers 130 over a wide area network 140 (e.g., Internet) to obtain backhaul information 133 for the network 100. The probing signals 123 may include, but are not limited to, backhaul bandwidth measurements and latency measurements to the one or more reference servers 130. After obtaining the backhaul information 133 for the network 100, the AP 120 provides the backhaul information to the STA 110, via a message 135 based on the backhaul information 133. The message 135 may include relevant information such as, but is not limited to, backhaul metrics, user load, expected throughput share, and/or the like. The backhaul information can be obtained, for example, periodically (e.g., hourly), on demand, or in response to a request made by the STA 110.

Figure 2:
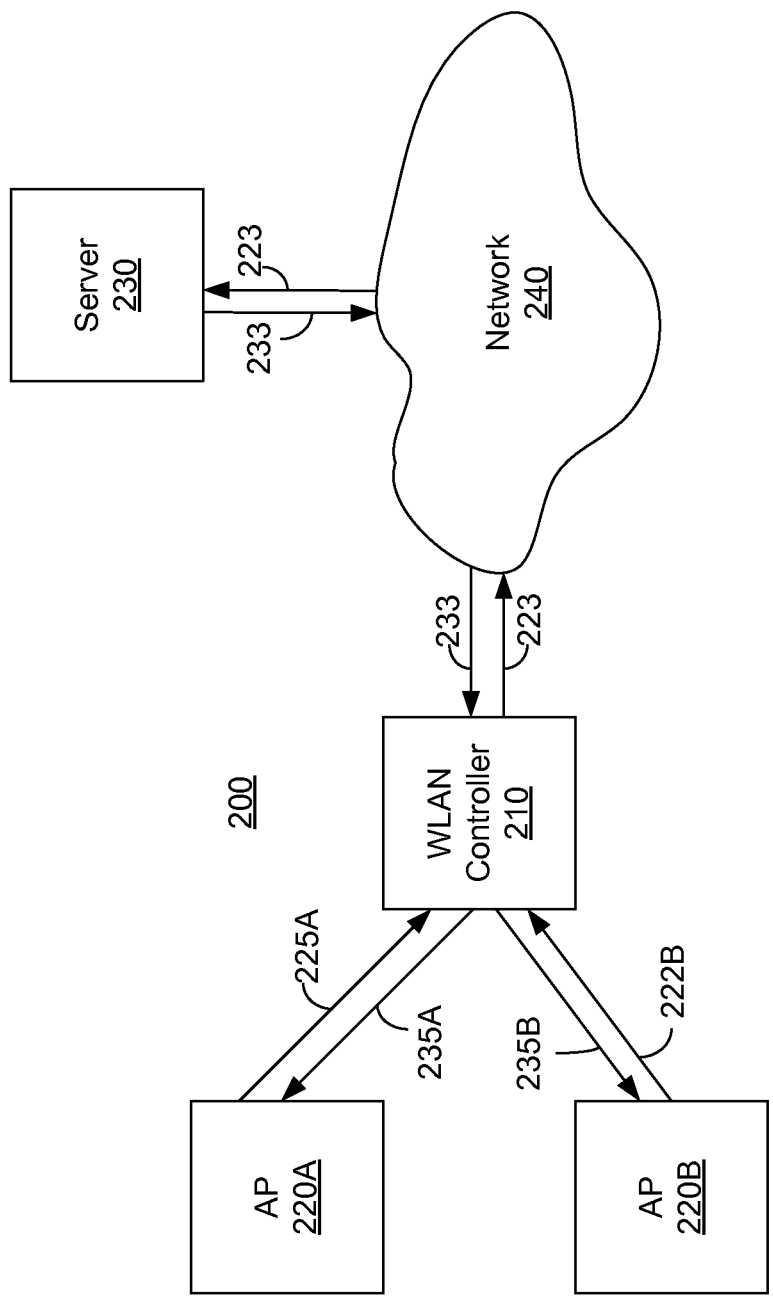
FIG. 2 is a network environment according to various embodiments of the disclosure.

FIG. 2 is network environment 200 that includes plurality of APs 220A, 220B, a WLAN controller 210, and one or more reference servers 230. In various embodiments, one (or more) of the APs 220A, 220B provide the WLAN controller (or AP controller) 210 with requests 225A, 225B, respectively, to initiate obtaining backhaul information for the network 200.

In response to receiving one of the requests 225A, 225B, the WLAN controller 210 sends probing signals 223 to the one more reference servers 230 over a wide area network 240 (e.g., Internet) to obtain backhaul information 233 for the network 200. The probing signals 223 may include, but are not limited to, backhaul bandwidth measurements and latency measurements to the one or more reference servers 230. After obtaining the backhaul information 233 for the network 200, the WLAN controller 210 provides the backhaul information 233 to the requesting STA 220A, 220B, via a message 235A, 235B based on the backhaul information 233. The message 235A, 235B may include relevant information such as, but is not limited to, backhaul metrics, user load, expected throughput share, and/or the like.

The requesting AP 220A, 220B (which may correspond to the AP 120 in FIG. 1), for instance, may send the request 225A, 225B in response to a request (e.g., 125 in FIG. 1) received from a STA (e.g., the STA 110 in FIG. 1). In other embodiments, the request 225A, 225B is sent before receiving the request from the STA so that the requested information (backhaul information) is available for the STA when the STA request for such information. The backhaul information can be obtained, for example, periodically (e.g., hourly), on demand, or in response to a request made by the AP 220A, 220B.

With reference to FIGS. 1 and 2, in various embodiments, the STA uses the backhaul information for selection of an AP that provides the best end-to-end network characteristics, by including in the end-to-end analysis the STA-to-AP link information that the STA obtains. That is, the STA combines the AP-collected backhaul information ("backhaul metric") with local link information ("local link metric") to make a selection of an appropriate AP in a locality that has a plurality of APs from which to choose. In other embodiments, the local link metric and the backhaul metric can be combined by the AP and provided to the STA.

According to various embodiments, the backhaul information can be delivered from an AP (e.g., 120) to a STA (e.g., 110) via an suitable mechanism, including (but not limited to)

by using beacons, service advertisements (in accordance with the IEEE 802.11u protocol), HyperText Transfer Protocol (HTTP) or some other service on a port of an AP, and/or the like. According to various embodiments, when the STA is deciding to associate with an AP and is not yet associated with an AP in the network, the backhaul information may be obtained directly from the WLAN controller 210 by out-of-band communication, such as 3G, and/or the like.

In various embodiments the AP (e.g., 120, 220A, 220B) collects backhaul information that includes network bandwidth information and latency information (e.g., round trip time for data to go from one device, such as an AP, to another device, such as a reference server on the Internet). Instead of determining raw bandwidth, throughput shares can also be determined by the AP and provided to the STA 110, as a different metric to be used by the STAs in making a decision as to which AP to connect to in a locality having a plurality of APs (and thus a plurality of hot spots) from which the STAs may choose. The APs can estimate the throughput shares of the network and provide the throughput shares to the STA, so that the STA can make a more informed decision as to which AP among the plurality of APs to connect, as opposed to just receiving network bandwidth information on the end-to-end link. In some embodiments, the AP can estimate the throughput shares based on the priorities of the number of connected users. In particular embodiments, some users, such as users in an enterprise environment, may be deemed to have a higher priority than other users in the network. In particular embodiments, the throughput shares can be estimated based on priorities of traffic in progress, e.g., video vs. voice, HTTP, and/or the like. Thus, for example, even if an end-to-end link is fairly congested with existing traffic, the AP can provide backhaul information (e.g., throughput shares) to a high-priority STA that indicates that the high priority STA may be able to connect to the AP and have fairly uncongested network access to communication with another STA over the network, because many of the existing users connected to the AP are visitors that have low priority rights on the network.

In various embodiments, when the AP (e.g., 120) receives the backhaul information (e.g., 133) obtained by probing the one or more reference servers (e.g., 130), for example, the backhaul measurement data is cached at the AP, for later transmission to the STA (e.g., 110) requesting that data. Based on backhaul information obtained over a period of time (e.g., over the last day, the last week, the last month, etc.), lookup tables can be constructed by the AP to learn: a) number of users versus expected throughput, and b) backhaul metric versus time of day. The "learned" backhaul information can also be provided to the STA, in certain embodiments, to allow the STA to make an informed AP selecting decision. In some embodiments, the backhaul measurements can be cached (or otherwise stored) at the AP. In other embodiments, the backhaul measurements are cached at the WLAN controller (e.g., 210).

Depending on the current load, in certain embodiments, an AP (e.g., 120) can choose to obtain new backhaul information upon a request from an STA (e.g., 110). In other embodiments, the AP can provide old (e.g., most recently collected and processed) backhaul information to the STA. Thus, if the current load of the AP is greater than a predetermined load (e.g., 75% or greater), the AP provides most recently collected and processed backhaul information to a requesting STA. In some embodiments, by providing previously collected backhaul information to the STA, congestion (e.g., bottlenecking) may be mitigated. In other embodiments, the AP may send previously collected backhaul information irrespective of load on the AP.

In various embodiments, if an AP is loaded, the AP may request other APs in the network or the WLAN controller, which is controlling the AP, to provide backhaul information already collected and processed. In some embodiments, the backhaul information from the other APs or the WLAN controller is broadcast over a subnet. In other embodiments, the backhaul information is encapsulated in another protocol, such as LightWeight Access Point protocol (LWAPP) and/or the like. Accordingly, by obtaining the backhaul information from another device, the loaded AP can provide the backhaul information to the requesting STA. In other embodiments, the AP may request backhaul information from other APs in the network or the WLAN controller irrespective of load on the AP.

Figure 3:
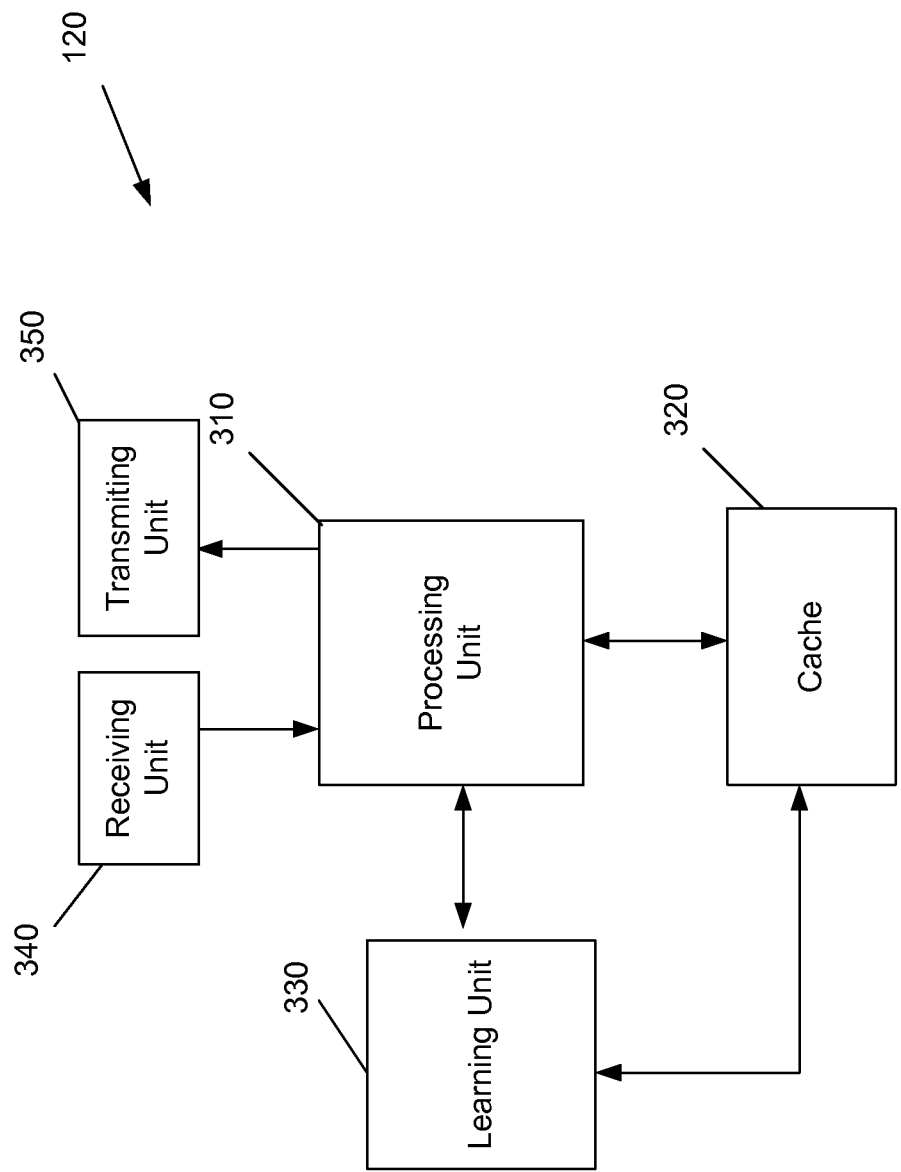
FIG. 3 is a block diagram of at least a portion of an Access Point according to various embodiments of the disclosure.

FIG. 3 illustrates an AP (e.g., 120 in FIGS. 1 and 220A, 220B in FIG. 2) that includes a receiving unit 340 for receiving signals from a requesting STA (e.g., 110 in FIG. 1). The received signals may correspond to requests from the STA for network information (e.g., backhaul information). A processing unit 310 outputs backhaul information requests to the network based on a request received from the requesting STA. The processing unit 310 receives the backhaul information that was performed on the network based on the request sent over the network. The backhaul information is stored in a cache (or other suitable storage medium) 320. A transmitting unit 350 transmits to the requesting STA a message that, at least, includes the backhaul information obtained in response to the request of the requesting STA. In other embodiments, the transmitter unit 350 may send stored backhaul information in the cache the cache 320 to the requesting STA. That is, in particular embodiments, the backhaul information sent to the requesting STA may not have been obtained in response to a particular request by the requesting STA. For example, the backhaul information that is sent may have been obtained in response to a previous request by the STA (or other STA) or done by the AP without being triggered by an STA.

In some embodiments, a learning unit 330 may also be provided for analyzing the stored backhaul information to determine various metrics relating to the network (e.g., number of users versus expected throughput, backhaul metric versus time of day, and/or the like). The various metrics (or data corresponding to the metrics) may be transmitted to the requesting STA to allow the requesting STA to make a more informed decision when selecting an AP. In some embodiments, the metrics are sent to the requesting STA with the message including the backhaul information. In other embodiments, the metrics are sent separately from the message including the backhaul information.

Figure 4:
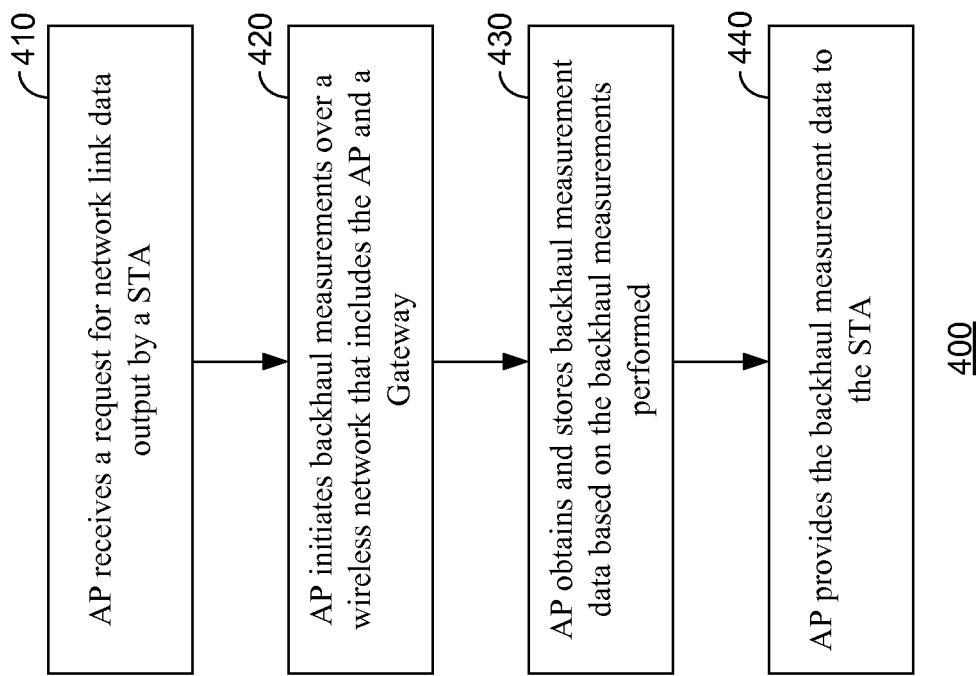
FIG. 4 is a flow diagram of an end-to-end backhaul measurement method according to various embodiments of the disclosure.

FIG. 4 illustrates an end-to-end backhaul measurement method according to various embodiments of the disclosure. With reference to FIGS. 1-4, at block 410, an AP (e.g., 120) receives a request for network link data output by a STA (e.g., 110). The network link data is information to be used by the STA in deciding which of a plurality of APs (e.g., hot spots) to connect to. At block 420, the AP initiates backhaul measurements over a wireless network (e.g., 140) that includes the AP and a Gateway. At block 430, the AP obtains and stores backhaul information (backhaul measurement data) based on the backhaul measurements performed. At block 440, the AP provides the backhaul measurement data to the STA.

Various embodiments augment existing IEEE 802.11v measurements and can remove redundancy in measurement phases. This redundancy removal is achieved by the IEEE 802.11v protocol already defines ways to estimate and propagate local (wireless) link metrics to a STA before and after association with an AP. Hence, a backhaul measurement alone would typically be sufficient to obtain the overall endto-end link statistics. For example, when a STA requests an AP for link statistics, the AP can do backhaul measurements, or it can request its AP controller to do the backhaul measurements, or it can return cached information to the STA of recently conducted backhaul measurements by the AP if the AP is overloaded, or it can return cached information to the STA of recently conducted backhaul measurements made by the AP's AP controller or made by other APs on its subnet if the AP is overloaded. Before sending out the backhaul information to the requesting STA, the AP can augment the backhaul information with local wireless link statistics that it obtains, and send the entire bundle of information, as complete end-to-end link statistics information, to the STA.

Embodiments of the invention allow a user of a STA to intelligently select an AP from an end-to-end perspective, while also maintaining a low overhead on network devices that perform the end-to-end measurements. This reduces overhead and congestion on a wireless link by not requiring end-to-end measurements from each STA to reference servers sent via an AP, as is required for conventional systems and methods for providing network statistical information to STAs.

In some embodiments, an STA requests a first AP connected to a first type of network (e.g., a 4G or LTE network) to perform backhaul measurement data over the first type of network, and the STA also requests a second AP connected to a second type of network (e.g., a 3G network or a radio network) to perform backhaul measurement data over the second type of network. Based on the backhaul measurement data received from the first and second APs, the STA determines whether to connect to the first type of network or to the second type of network.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. For example, the systems and methods described above are also applicable to non-WiFi devices with local scope, such as whitespace devices with backhauls or to Femtocells and/or Nanocells that overlap a portion of a WLAN network. Thus, the present disclosure is not intended to be limited to the embodiments shown herein but is to be accorded the widest scope consistent with the principles and novel features disclosed herein.

What is claimed is:

1. A method of providing network data to a Station, comprising:
receiving, by an Access Point of a plurality of Access Points, a request for network link data output by the Station, to be used by the Station in deciding which of the plurality of Access Points to connect to;
initiating, by the Access Point, backhaul measurements over a network that includes the Access Point and a Gateway;
obtaining and storing, by the Access Point, backhaul measurement data based on the backhaul measurements performed; and
providing the backhaul measurement data to the Station.

2. The method according to claim 1, wherein initiating comprises:
transmitting probing signals from the Access Point to the Gateway; and
obtaining backhaul bandwidth data and latency data based on receipt of the probing signals from the Gateway to the Access Point.

3. The method according to claim 1, further comprising:
determining, by the Access Point, one or more of throughput load and user share information based on the backhaul measurement data obtained; and
providing the one or more of throughput load and user share information to the Station.

4. The method according to claim 1, further comprising:
determining wireless link statistics between the Station and the Access Point.

5. The method according to claim 4,
wherein the determining is performed by the AP; and
wherein the backhaul measurement data provided to the station includes the wireless link statistics.

6. The method according to claim 4, wherein the determining is performed by the Station.

7. The method according to claim 1, further comprising:
transmitting, to one of an Access Point controller associated with the AP or the Gateway, a request from the AP to perform the backhaul measurements; and
receiving, by the Access Point, backhaul measurement data based on the backhaul measurements performed by the one of the Access Point controller or the Gateway.

8. The method according to claim 1, further comprising:
caching the backhaul measurement data at the Access Point; and
sending the cached backhaul measurement data to the Station.

9. The method according to claim 8, wherein the cached backhaul measurement data was obtained based on a previous request made by a Station.

10. The method according to claim 8, wherein the cached backhaul measurement data was obtained based on a previous link measurement made by the AP controller or the Gateway that was not based on an end-to-end link request made by a Station.

11. The method according to claim 1, wherein providing comprises:
sending the backhaul measurement data to the Station in the form of a beacon, an 802.11.0 service advertisement, or as a Hypertext Transfer Protocol (HTTP) message.

12. A non-transitory computer-readable medium comprising code for:
receiving a request for network link data output by a Station, to be used by the Station in deciding which Access Point of a plurality of Access Points to connect to;
initiating backhaul measurements over a network that includes the Access Point and a Gateway;
obtaining and storing backhaul measurement data based on the backhaul measurements performed; and
providing the backhaul measurement data to the Station.

13. The non-transitory computer-readable medium according to claim 12, wherein the initiating comprises:
transmitting probing signals to the Gateway; and
obtaining backhaul bandwidth data and latency data based on receipt of the train of pulses from the Gateway.

14. The non-transitory computer-readable medium according to claim 12, the computer-readable medium comprising code for:
determining one or more of throughput load and user share information based on the backhaul measurement data obtained; and
providing the one or more of throughput load and user share information to the Station.

15. The non-transitory computer-readable medium according to claim 12, the computer-readable medium comprising code for:
determining wireless link statistics between the Station and the Access Point.

16. The non-transitory computer-readable medium according to claim 15,
wherein the determining is performed by the AP; and
wherein the backhaul measurement data provided to the station includes the wireless link statistics.

17. The non-transitory computer-readable medium according to claim 15, wherein the determining is performed by the Station.

18. The non-transitory computer-readable medium according to claim 12, the computer-readable medium comprising code for:
transmitting, to one of an Access Point controller or a Gateway, a request from the Access Point to perform the backhaul measurements; and
receiving, by the Access Point, backhaul measurement data based on the backhaul measurements performed by the one of the Access Point controller or the Gateway.

19. The non-transitory computer-readable medium according to claim 12, the computer-readable medium comprising code for:
caching the backhaul measurement data; and
sending the cached backhaul measurement data to the Station.

20. The non-transitory computer-readable medium according to claim 19, wherein the cached backhaul measurement data was obtained based on a previous request made by a Station.

21. The non-transitory computer-readable medium according to claim 12, wherein the providing comprises:
sending the backhaul measurement data to the Station in the form of a beacon, an 802.11.0 service advertisement, or as Hypertext Transfer Protocol (HTTP) message.

22. An Access Point apparatus for providing network data to a Station, comprising:
means for receiving a request for network link data output by the Station to be used by the Station in deciding which of the plurality of Access Points to connect to;
means for initiating backhaul measurements over a network that includes the Access Point and a Gateway;

means for obtaining and storing backhaul measurement data based on the backhaul measurements performed; and means for providing the backhaul measurement data to the Station.

23. The apparatus according to claim 22, wherein the means for initiating comprises:

means for transmitting probing signals from the Access Point to the Gateway; and means for obtaining backhaul bandwidth data and latency data based on receipt of the probing signals from the Gateway to the Access Point.

24. The apparatus according to claim 22, further comprising:

means for determining one or more of throughput load and user share information based on the backhaul measurement data obtained; and means for providing the one or more of throughput load and user share information to the Station.

25. The apparatus according to claim 22, further comprising:

means for determining wireless link statistics between the Station and the Access Point.

26. The apparatus according to claim 25,
wherein the means for determining is the AP; and
wherein the backhaul measurement data provided to the station includes the wireless link statistics.

27. The apparatus according to claim 25, wherein the means for determining is the Station.

28. The apparatus according to claim 22, further comprising:

means for transmitting, to one of an Access Point controller associated with the AP or the Gateway, a request to perform the backhaul measurements; and means for receiving backhaul measurement data based on the backhaul measurements performed by the one of the Access Point controller or the Gateway.

29. The apparatus according to claim 22, further comprising:

means for caching the backhaul measurement data; and
means for sending the cached backhaul measurement data to the Station.

30. The apparatus according to claim 29, wherein the cached backhaul measurement data was obtained based on a previous request made by a Station.

31. The apparatus according to claim 29, wherein the cached backhaul measurement data was obtained based on a previous link measurement made by the AP controller or the Gateway that was not based on an end-to-end link request made by a Station.

32. The apparatus according to claim 22, wherein the means for providing comprises:

means for sending the backhaul measurement data to the Station in the form of a beacon, an 802.11.0 service advertisement, or as a Hypertext Transfer Protocol (HTTP) message.

33. An Access Point apparatus for providing network data to a Station, comprising:

a receiver for receiving a request for network link data output by the Station, to be used by the Station in deciding which of the plurality of Access Points to connect to;

a processor for initiating backhaul measurements over a network that includes the Access Point and a Gateway, the processor configured to obtain backhaul measurement data based on the backhaul measurements performed;

a storage medium for storing the backhaul measurement data; and a transmitter for transmitting the backhaul measurement data to the Station.

34. The apparatus according to claim 33, the processor configured to transmit probing signals to the Gateway and configured to obtain backhaul bandwidth data and latency data based on receipt of the probing signals from the Gateway to the Access Point.

35. The apparatus according to claim 33,
the processor configured to determine one or more of throughput load and user share information based on the backhaul measurement data obtained; and
the transmitter configured to transmit the one or more of throughput load and user share information to the Station.

36. The apparatus according to claim 33, the processor configured to determine wireless link statistics between the Station and the Access Point.

37. The apparatus according to claim 36, wherein the backhaul measurement data provided to the station includes the wireless link statistics.

38. The apparatus according to claim 33,
the transmitter configured to transmit to one of an Access Point controller associated with the AP or the Gateway, a request from the AP to perform the backhaul measurements; and
the receiver configured to receive backhaul measurement data based on the backhaul measurements performed by the one of the Access Point controller or the Gateway.

39. The apparatus according to claim 33,
the storage medium configured to store the backhaul measurement data; and
the transmitter configured to send the stored backhaul measurement data to the Station.

40. The apparatus according to claim 39, wherein the stored backhaul measurement data was obtained based on a previous request made by a Station.

41. The apparatus according to claim 39, wherein the stored backhaul measurement data was obtained based on a previous link measurement made by the AP controller or the Gateway that was not based on an end-to-end link request made by a Station.

42. The apparatus according to claim 33, wherein the backhaul measurement data is transmitted to the Station in the form of a beacon, an 802.11.0 service advertisement, or as a Hypertext Transfer Protocol (HTTP) message.

43. A method of providing network data to a Station, comprising:

receiving, by a first Access Point providing connectivity to a first type of network and a second Access Point providing connectivity to a second type of network, a request for network link data output by the Station, to be used by the Station in deciding which of a plurality of Access Points to connect to;

initiating, by the first Access Point and the second Access Point, backhaul measurements over the first and second types of networks, respectively;

obtaining and storing, by the first Access Point and the second AP, backhaul measurement data based on the backhaul measurements performed over the first and second types of networks, respectively; and providing the backhaul measurement data over the first and second types of networks, respectively to the Station.

44. The method according to claim 43, wherein the Station determines which of the first and second types of networks to connect to, based on the backhaul measurement date that it receives from the first Access Point and the second Access Point.

45. The method according to claim 43, wherein the first type of network is a Wireless Local Area Network (WLAN) and the second type of network is a radio network.

46. The method according to claim 43, wherein the first type of network is a Wireless Local Area Network (WLAN) and the second type of network is a Wide Area Network (WAN).

* * * * *